United States Patent
Heilig

(10) Patent No.: US 9,452,778 B2
(45) Date of Patent: Sep. 27, 2016

(54) METHOD FOR OPERATING AN ELECTRIC POWER ASSISTED STEERING SYSTEM FOR A MOTOR VEHICLE

(71) Applicant: ZF LENKSYSTEME GMBH, Schwaebisch Gmuend (DE)

(72) Inventor: Arnulf Heilig, Schwaebisch Gmuend (DE)

(73) Assignee: Robert Bosch Automotive Steering GmbH, Schwaebisch Gmuend (DE)

( * ) Notice: Subject to any disclaimer, the term of this patent is extended or adjusted under 35 U.S.C. 154(b) by 0 days.

(21) Appl. No.: 14/415,819

(22) PCT Filed: Aug. 1, 2013

(86) PCT No.: PCT/EP2013/066152
§ 371 (c)(1),
(2) Date: Jan. 20, 2015

(87) PCT Pub. No.: WO2014/029597
PCT Pub. Date: Feb. 27, 2014

(65) Prior Publication Data
US 2015/0175197 A1 Jun. 25, 2015

(30) Foreign Application Priority Data
Aug. 20, 2012 (DE) .................. 10 2012 107 597

(51) Int. Cl.
*B62D 12/00* (2006.01)
*B62D 6/00* (2006.01)
*B62D 5/04* (2006.01)

(52) U.S. Cl.
CPC ............. *B62D 6/008* (2013.01); *B62D 5/0463* (2013.01)

(58) Field of Classification Search
CPC ............. B60W 10/08; B60W 10/184; B60W 2720/14; B60W 30/045; B60W 10/04; B60W 10/119; B60W 10/18; B60W 2720/30; B60L 2220/18; B60L 11/1807; B60L 11/14; B60L 11/1803; B60L 11/1877; B60L 15/20
USPC .......................................................... 701/42
See application file for complete search history.

(56) References Cited

U.S. PATENT DOCUMENTS

| | | | |
|---|---|---|---|
| 6,250,419 B1 | 6/2001 | Chabaan | |
| 7,036,626 B2 | 5/2006 | Niessen et al. | |
| 8,020,440 B2* | 9/2011 | Modugno | G01C 19/5776 73/504.04 |
| 8,140,222 B2 | 3/2012 | Watanabe et al. | |

(Continued)

FOREIGN PATENT DOCUMENTS

| | | |
|---|---|---|
| DE | 101 15 018 | 11/2002 |
| DE | 103 25 587 | 1/2004 |

(Continued)

*Primary Examiner* — Muhammad Shafi
(74) *Attorney, Agent, or Firm* — Jordan and Koda PLLC

(57) ABSTRACT

A method for determining a desired preset value ($_y$MSM) for a motor torque of an electric servomotor in a power assisted steering system for a motor vehicle, wherein the desired preset value is determined using a motor torque servo control component (MVSK) which forms a controlled section, and using a motor torque regulator component (MRK) which forms a regulated section, wherein the regulating variable is a torsion bar torque (MDS), the two motor torque components being functionally offset against one another in order to determine therefrom the desired preset value (YMSM) for the motor torque (MSM) of the servomotor (SM).

13 Claims, 3 Drawing Sheets

(56) References Cited

U.S. PATENT DOCUMENTS

| | | |
|---|---|---|
| 2004/0084241 A1 | 5/2004 | Niessen et al. |
| 2006/0000663 A1 | 1/2006 | Takimoto et al. |
| 2009/0099731 A1 | 4/2009 | Watanabe et al. |
| 2009/0118079 A1* | 5/2009 | Heap ............... B60K 6/365 477/3 |
| 2012/0035811 A1 | 2/2012 | Gruener |

FOREIGN PATENT DOCUMENTS

| | | |
|---|---|---|
| DE | 10 2005 009 952 | 9/2006 |
| DE | 601 19 598 | 12/2006 |
| DE | 602 14 637 | 8/2007 |
| DE | 10 2009 002 703 | 11/2010 |
| EP | 1 285 833 | 2/2003 |
| EP | 2050655 A2 * | 10/2008 |
| EP | 2 050 655 | 4/2009 |

* cited by examiner

METHOD FOR OPERATING AN ELECTRIC POWER ASSISTED STEERING SYSTEM FOR A MOTOR VEHICLE

BACKGROUND OF THE INVENTION

The invention relates to a method for operating en electric power assisted steering system.

Various methods for generating a motor torque desired preset value for a servomotor are known from the prior art:

DE 101 15 018 A1 discloses a vehicle steering system in which a state closed-loop controller generates a manipulated variable for the control device by means of state variables of the vehicle, in which the steering forces to be applied by the driver would be minimal. On the basis of this torque-free steering system it is possible to apply a reference variable.

DE 10 2009 002 703 A1 discloses a regulating structure for determining a manipulated variable for actuating a torque actuator in an electrical vehicle steering system as a function of a predetermined desired torsion bar torque, wherein an actual torsion bar torque is detected, a differential torque is formed from the desired torsion bar torque and the actual torsion bar torque, and the manipulated variable is determined by means of an output feedback closed-loop controller as a function of the differential torque.

SUMMARY OF THE INVENTION

The object of the present invention is to propose a method for determining a desired presetting for a motor torque which, compared to the known methods, permits a basic setting which is easy to perform and at the same time permits comprehensive and precise influencing of the steering behavior and the steering sensation communicated to the driver.

The method provides that a desired preset value is formed from at least two motor torque components, specifically a motor torque pilot control component which forms an open-loop controlled portion and a motor torque closed-loop controller component which forms a closed-loop controlled portion, wherein the closed-loop control variable is a torsion bar torque.

The two motor torque components are functionally combined with one another here in order to determine therefrom the desired preset value for the motor torque of the servomotor.

Advantageous developments of the method are represented in the dependent claims which are explained in more detail by means of the description of the figures.

Accordingly, there is provision that in order to determine a desired preset value the motor torque pilot control component is determined at least as a function of a torsion bar torque ($M_{DS}$), wherein in addition a vehicle speed can be taken into account and the motor-torque closed-loop controller component is determined as a function of a closed-loop control difference formed from the torsion bar torque and an application torsion bar torque based on the toothed rack force.

It is advantageous that the motor torque pilot control component is determined using an assistance characteristic curve which determines a pilot control portion at least as a function of the torsion bar torque. In addition, the assistance characteristic curve can be parameterized as a function of the vehicle speed, wherein intermediate values are interpolated.

One preferred embodiment provides that the motor torque pilot control component is determined by a closed-loop controller. In this context, a range-limited (saturated) PID controller is preferably used.

According to the invention there is provision to limit the motor torque closed-loop controller component to a steering-specific, maximum deliverable limiting value. This preferably takes place as a function of the vehicle speed.

Furthermore, there is provision chat the motor torque pilot control component is determined using an assistance characteristic curve to which a vehicle speed is fed as a further input variable.

The application torsion bar torque is preferably determined using a determined toothed rack force and/or further steering-specific or vehicle movement dynamics vehicle variables and/or on the basis of different steering function components.

The motor torque components are subsequently combined functionally with one another in order to determine therefrom the desired preset value for the motor torque.

The subject matter of the invention is also a computer program having program code means in order to carry out a method according to the invention when the program is executed on a microprocessor of a computer, in particular on a control unit of a power assisted steering system or power steering system.

The subject matter of the invention is also a corresponding control unit for operating a power assisted steering system or power steering system configured for carrying out a method according to the invention or for executing a corresponding computer program, as well as a power assisted steering system or power steering system equipped with a corresponding control unit.

DETAILED DESCRIPTION OF THE PREFERRED EMBODIMENTS

A pilot control module 100 determines, on the basis of a torsion bar torque $M_{DS}$ detected at the steering column, a first component, the motor torque pilot control component $M_{VSK}$. This component represents an open-loop controlled portion of the motor torque. The pilot control module 100 additionally uses the vehicle speed $v_{FZG}$ for this purpose. The module 100 contains an assistance characteristic curve which determines the motor torque pilot control component $M_{VSK}$ as a function of the torsion bar torque $M_{DS}$ and the vehicle speed $v_{FZG}$.

Furthermore, a torsion bar torque application module 200 determines an application torsion bar torque $M_{DS,\ Appl}$. This component represents a closed-loop controlled portion of the motor torque.

Figure 3:
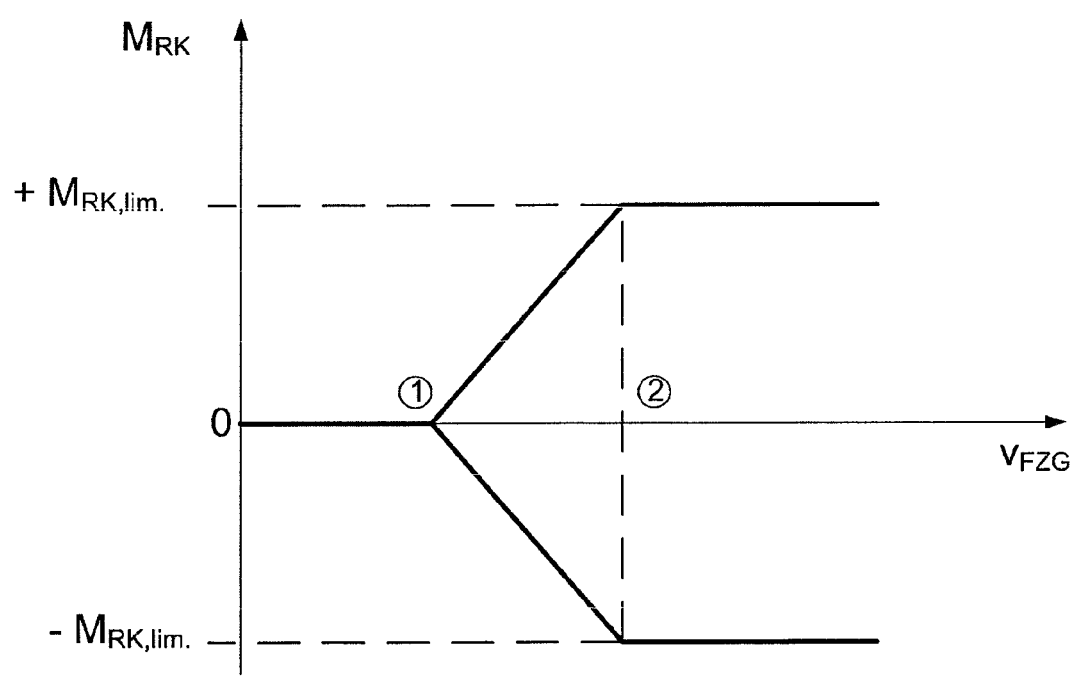
FIG. 3 shows a limitation of the maximum permissible portion of the motor torque closed-loop controller component in the form of an envelope curve.

More details are given about the determination of the value of the application torsion bar torque $M_{DS,\ Appl}$ in the description of FIG. 3.

This variable represents, as it were, a reference variable for a subsequent closed-loop control process and is decisive for the desired steering sensation which is to be communicated to the driver. The application torsion bar torque $M_{DS, Appl}$ is used as a "reference variable", wherein a closed-loop control difference with respect to the torsion bar torque MDs is determined by means of a closed-loop control difference-determining element 102. A second component, the motor torque closed-loop control component $M_{RK}$ is determined by means of a downstream closed-loop controller, the torsion bar-twisting closed-loop controller mode 101. This component represents a closed-loop controlled portion of the motor torque. The closed-loop controller is preferably embodied as a range-limited (saturated) PID controller. This permits simple and stable application for the respective vehicle.

Both components are combined by means of a combination element 103 for forming a desired preset value $yM_{SM}$ for the motor torque $M_{SM}$ which is to be output by the servomotor SM. In the simplest case, this is done by summing the two values.

The desired preset value $yM_{SM}$ is fed to an output stage unit which generates corresponding phase currents $I_M$ for the servomotor by means of a subordinate, field-oriented closed-loop control stage (FOR).

The motor torque pilot control component $M_{VSK}$ determined at least as a function of a torsion bar torque $M_{DS}$ and the motor torque closed-loop controller component $M_{RK}$ is determined as a function of a closed-loop control difference between the torsion bar torque $M_{DS}$ and the application torsion bar torque $M_{DS, Appl}$. The torsion bar torque is measured in the region of the steering column by means of a suitable sensor.

In the exemplary embodiment shown, the motor torque pilot control component $M_{VSK}$ is determined using an assistance characteristic curve to which the vehicle speed $v_{FZG}$ is fed as a further input variable.

The advantages of the method can be seen in particular in the fact that the requirements regarding the dynamics of the system can be met by means of the pilot control portion $M_{VSK}$, wherein at the same time the closed-loop controlled portion $M_{RK}$ can be superimposed on a "desired" steering sensation which is to be communicated to the driver. Rapid steering movements of the driver are therefore transmitted in the form of a highly dynamic steering process to the steering system, and at the same time closed-loop controlled influence, which is limited in its effect, can be applied to a driver's steering torque in accordance with a desired preset value.

By means of a pilot control process, initiated by means of the pilot control module 100, for the motor torque $yM_{SM}$, a "basic assistance" by the servomotor is impressed into the steering system, in particular in the event of high assistance torques being necessary. This basic assistance is excepted from the closed-loop control and therefore corresponds in functional terms to a "basic assistance open-loop control".

The pilot control module 100 determines a motor torque pilot control component $M_{VSK}$ on the basis of the vehicle speed $V_{FZG}$ and the torsion bar torque $M_{DS}$, corresponding to a "basic assistance".

The behavior of the pilot control module 100 is implemented here in such a way that the value of the motor torque pilot control component $M_{VSM}$ decreases as the vehicle speed increases and is increased as the torsion bar torque increases.

Closed-loop control of the torsion bar torque $M_{DS}$, initiated by means of the torsion bar twisting closed-loop controller module 101 proves very advantageous, in particular in the event of low or very small assistance torques occurring in the "coupling region", i.e. in the region relatively close to the straight-ahead position of the steering wheel: in this context, typically relatively low assistance forces of the order of magnitude of approximately 0.5 Nm occur.

Here, the torsion bar twisting closed-loop controller module 101 performs the function of a "genuine" closed-loop controller for the torsion bar torque $M_{DS}$ on the basis of a desired presetting $M_{DS, Appl}$ of the torsion bar torque application module 200.

By virtue of the transmission ratio of the transmission, these small assistance torques have a correspondingly amplified effect on the steering sensation. For this reason, a closed-loop control process of the torsion bar torque has a particularly positive effect on the steering sensation which is communicated to the driver.

it is considerably advantageous here to implement the torsion bar twisting closed-loop controller module 101, i.e. the actual closed-loop controller which contains the closed-loop control law for performing closed-loop control of the torsion bar torque, as a saturated PID (Proportional-Integral-Differential) controller. This permits the closed-loop controller to be adapted for all conceivable driving situations in a way which involves relatively low expenditure.

The saturated region of the closed-loop controller is approximately in a range from +/−0.5 Nm. Within this range, closed-loop controlled, free influencing of the driver steering torque is possible. This has the effect that during straight-ahead travel the closed-loop controlled portion dominates, while in the case of rapid steering movements the open-loop controlled portion is prevalent.

For this reason, the motor torque closed-loop controller component $M_{RK}$ is limited to a steering-specific, maximum deliverable limiting value $+/-M_{RK,lim}$. The motor torque closed-loop controller component $M_{RK}$ is limited here as a function of the vehicle speed $v_{FZG}$.

Figure 2:
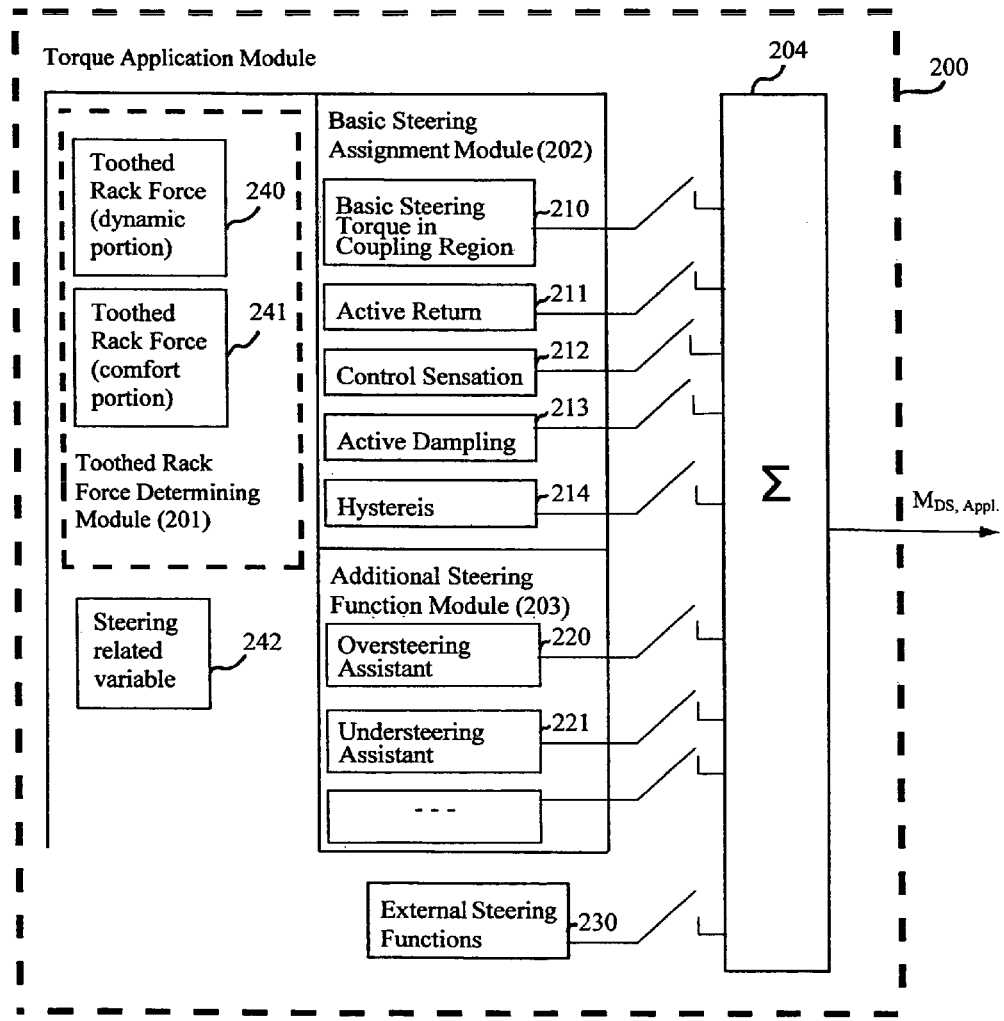
FIG. 2 shows by way of example different methods for generating the application torsion bar torque.

FIG. 2 shows by way of example different methods for generating the application torsion bar torque $M_{DS,Appl}$. The methods can be applied in isolation or in combination with one another.

The torsion bar torque application module 200 includes a toothed rack force-determining module 201 which determines a calculated or estimated toothed rack force (ZSK) value.

Furthermore, the module 200 contains a block 242 which contains steering-related or vehicle-specific variables, for example the instantaneous steering angle, the steering angle speed, the current velocity, the rotor rotational speed of the servomotor and further vehicle movement dynamics variables.

In the embodiment shown, two ZSK values which are determined in different ways are determined:

A dynamic portion 240 (ZSK-D) and a comfort-related portion 241 (ZSK-C). The ZSK-D values are determined here from steering-internal variables which describe a torque or force within the steering device on the basis of mechanical and/or electrical equations. The ZSK-C value is determined using steering-external vehicle variables which describe a movement state on the basis of physical motion relationships.

Both ZSK variables can be combined with one another to form a resulting toothed rack force or mixed in any desired ratio with one another, depending on the driving conditions. The resulting toothed rack force is subsequently fed to individual functional units of the basic steering assistance module 202 or the additional steering function module 203.

The functional units of the basic steering assistance module 202 can contain the following components here: A basic steering torque in the coupling region 210, an active return function 211, a central sensation functional unit 212, an active damping function 213 and a friction and hysteresis compensation unit 214.

The functional units of the additional steering function module 203 can contain the following components:

An oversteering assistance function 220 and an understeering assistance function 221.

Furthermore, superordinate interventions can be provided by the vehicle manufacturer by means of an interface with OEM functions 230. These include autonomous steering interventions such as for example, lane keeping and follow-on guidance or the initiation of avoidance manoeuvres.

A number of functional units 202, 203 require the additional or exclusive use of steering-related variables of the block 242. For example, the active damping function 213 can determine a damping-specific portion of the application torsion bar torque solely on the basis of the instantaneous rotor speed of the servomotor.

Figure 1:
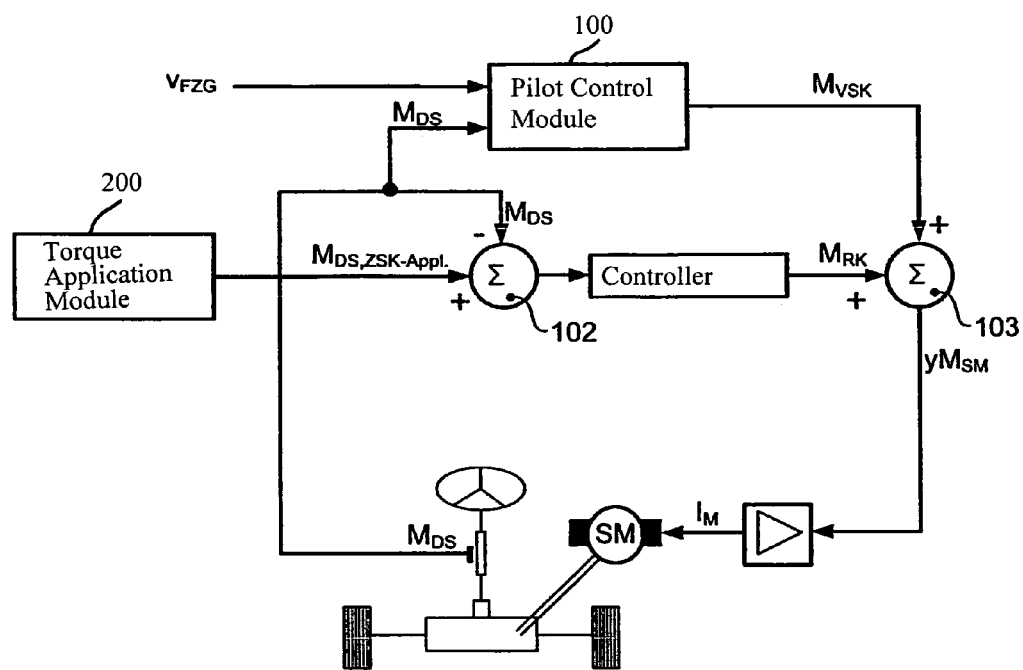
FIG. 1 shows a structural diagram on the basis of which a preferred embodiment of the method according to the invention is explained.

In conjunction with the embodiment of the invention described in FIG. 1 it is accordingly provided that the application torsion bar torque ($M_{DS, Appl}$) is determined using a determined toothed rack force (RFM-C, RFM-D) and/or by means of steering-specific or vehicle movement dynamics vehicle variables on the basis of different steering function components 210, 211, 212, 113, 214, 220, 220, 221, 230.

By means of a summing or weighting point 204 all the determined functional components are combined in order to form an overall application torsion bar torque $M_{DS,Appl}$.

In the simplest case, all the components are added up by means of an addition point 204 in order to determine the overall application torsion bar torque $M_{DS,Appl}$.

FIG. 3 shows a limitation of the maximum permissible portion of the motor torque closed-loop controller component MRK in the form of an envelope curve.

The limitation occurs preferably as a function of the vehicle speed $v_{FZG}$. From the stationary state up to a speed of approximately 10 to 15 km/h (point 1), the closed-loop controlled portion is 0 Nm, and starting from this speed the maximum permissible portion is increased in a ramp shape up to a second speed (point 2) up to a maximum symmetrical value of $+/-M_{RK, lim}$. This value is approximately 0.3 to 0.5 Nm.

LIST OF REFERENCE SYMBOLS

100 Pilot control module
101 Torsion bar twisting closed-loop controller module
102 Closed-loop control difference-determining element
103 Combination point
200 Torsion bar torque application module
201 Toothed rack force-determining module
202 Basic steering assistance module
203 Additional steering function module
204 Summing point
205 Torsion bar-twisting closed-loop controller module
210 Basic steering torque in the coupling region
211 Active return
212 Central sensation
213 Active damping
214 Hysteresis
220 Oversteering assistant
221 Understearing assistant
230 External steering functions
240 Toothed rack force, dynamic portion (ZSK-D)
241 Toothed rack force, comfort portion (ZSK-C)
242 Steering-related variables $M_{DS}$ Torsion bar torque
SM Servomotor
$l_M$ Servomotor current
$yM_{SM}$ Desired presetting for motor torque
$M_{SM}$ Motor torque
$M_{VSK}$ Motor torque pilot control component
$M_{RK}$ Motor torque closed-loop control component
$M_{DS, Appl}$. Application torsion bar torque
$v_{FZG}$ Vehicle speed

The invention claimed is:

1. A method for determining a desired preset value ($_yM_{SM}$) for a motor torque of an electric servomotor in a power assisted steering system for a motor vehicle, the power assisted steering system having a control unit comprising a processor and having a steering column, the method comprising:
   determining by the processor a motor torque pilot control component ($M_{VSK}$) based at least in part on a torsion bar torque ($M_{DS}$) detected at the steering column, the motor torque pilot control component ($M_{VSK}$) forming an open-loop controlled portion of said motor torque:
   determining by the processor a motor torque closed-loop controller component ($M_{RK}$) which forms a closed-loop controlled portion of said motor torque, wherein a closed-loop control variable of said closed-loop controlled portion is said torsion bar torque ($M_{DS}$);
   functionally combining by the processor the two motor torque pilot control components ($M_{VSK}$) and the motor torque closed-loop controller component ($M_{RK}$); and
   determining by the processor the desired preset value ($_yM_{SM}$) for the motor torque ($M_{SM}$) of the servomotor (SM) from the functionally combined motor torque pilot control component ($M_{VSK}$) and the motor torque closed-loop controller component ($M_{RK}$).

2. The method for determining a desired preset value ($_yM_{SM}$) as claimed in claim 1,
   wherein the motor torque closed-loop controller component ($M_{RK}$) is determined by the processor as a function of a closed-loop control difference between the torsion bar torque ($M_{DS}$) as said closed-loop control variable and an application torsion bar torque ($M_{DS, Appl}$) as a reference variable.

3. The method as claimed in claim 1, wherein the motor torque closed-loop controller component ($M_{RK}$) is determined by the processor as configured to provide closed-loop control.

4. The method as claimed in claim 3, wherein the motor torque closed-loop controller component ($M_{RK}$) is limited to a steering-specific, maximum deliverable limiting value ($+/-M_{RK,lim}$).

5. The method as claimed in claim 3, wherein the motor torque closed-loop controller component ($M_{RK}$) is limited as a function of the vehicle speed ($V_{FZG}$).

6. The method as claimed in claim 3, wherein the closed-loop controller is embodied as a range-limited PID controller.

7. The method as claimed in claim 1, wherein the motor torque pilot control component ($M_{VSK}$) is determined by the processor as a function of the torsion bar torque ($M_{DS}$) and a vehicle speed (VFZG) using an assistance characteristic curve.

8. The method as claimed in claim 1, wherein the application torsion bar torque (MDS, $_{Appl}$) is determined by the processor using a determined toothed rack force (RFM-C, RFM-D) and/or further steering-specific or vehicle movement dynamics vehicle variables.

9. The method as claimed in claim 8, wherein the application torsion bar torque ($M_{DS, Appl}$) is determined by the processor on the basis of different steering function components.

10. A nontransient computer-readable storage medium that store a computer program, said computer program when executed by a processor of a control unit of a power assisted steering system or power steering system, implementing a method comprising the steps of:
- determining by the processor a motor torque pilot control component ($M_{VSK}$) based at least in part on a torsion bar torque ($M_{DS}$) detected at the steering column, the motor torque pilot control component ($M_{VSK}$) forming an open-loop controlled portion of said motor torque;
- determining by the processor a motor torque closed-loop controller component ($M_{RK}$) which formed a closed-loop controlled portion of said motor torque, wherein a closed-loop control variable of said closed-loop controlled portion is said torsion bar torque ($M_{DS}$);
- functionally combining by the processor the motor torque pilot control component ($M_{VSK}$) and the motor torque closed-loop controller component ($M_{RK}$); and
- determing by the processor the desired preset value ($_{Y}M_{SM}$) for the motor torque ($M_{SM}$) of the servomotor (SM) from the functionally combined motor torque pilot control component ($M_{VSK}$) and the motor torque closed-loop controller component ($M_{RK}$).

11. A control unit of a power assisted steering system or a power steering system for a motor vehicle having a steering column, the control unit comprising a processor, the processor during execution of a computer program embodying various configurations which lead to a determination of a desired preset value ($_{Y}M_{SM}$) for a motor torque of an electric servomotor in the power assisted steering system or the power steering system; and
- wherein the processor has a first configuration among said various configurations to determine a motor torque pilot control component ($M_{VSK}$) of the motor torque based at least in part on a torsion bar torque ($M_{DS}$) detected at the steering column, the motor torque pilot control component ($M_{VSK}$) forming an open-loop controlled portion of said motor torque;
- wherein the processor has a second configuration among said various configurations to determine a motor torque closed-loop controller component ($M_{RK}$) forming an open-loop controlled portion of said motor torque, wherein a closed-loop control variable of said closed-loop controlled portion is said torsion bar torque ($M_{DS}$);
- wherein the processor has a third configuration among said various configurations to functionally combine the motor torque pilot control component ($M_{VSK}$) and the motor torque closed-loop controller component ($M_{RK}$); and
- wherein the processor has a fourth configuration among said various configurations to determine the desired preset value ($_{Y}M_{SM}$) for the motor torque ($M_{SM}$) of the servomotor (SM) from the functionally combined motor torque pilot control component ($M_{VSK}$) and the motor torque closed-loop controller component ($M_{RK}$).

12. The control unit of claim 11 in combination with said power assisted steering system or power steering system.

13. A method for determining a desired preset value ($_{Y}M_{SM}$) for a motor torque of an electric servomotor in a power assisted steering system for a motor vehicle, the power assisted steering system having a control unit comprising a processor, the method comprising:
- determining by the processor a motor torque pilot control component ($M_{VSK}$) which forms an open-loop controlled portion;
- determining by the processor a motor torque closed-loop controller component ($M_{RK}$) which forms a closed-loop controlled portion, wherein the closed-loop control variable is a torsion bar torque ($M_{DS}$);
- functionally combining by the processor the motor torque pilot control component and the motor torque closed-loop controller component; and
- determining by the processor the desired preset value ($_{Y}M_{SM}$) for the motor torque ($M_{SM}$) of the servomotor (SM) from the functionally combined motor torque pilot control component and the motor torque closed-loop controller component.

* * * * *